United States Patent [19]
Turner et al.

[11] Patent Number: 5,693,297
[45] Date of Patent: Dec. 2, 1997

[54] GAS TREATMENT METHOD

[75] Inventors: Harry M. Turner; Jeffrey M. Bigger. both of Dallas; James P. Meyer. Plano, all of Tex.

[73] Assignee: Atlantic Richfield Company. Los Angeles, Calif.

[21] Appl. No.: 577,741

[22] Filed: Dec. 22, 1995

[51] Int. Cl.$^6$ .................. B01D 53/14; C01B 17/16; C01B 31/20; C01B 17/20
[52] U.S. Cl. .................. 423/210; 95/231; 423/220; 423/226; 423/228; 423/229; 423/242.1; 423/242.2; 423/242.7
[58] Field of Search .................. 423/226, 228, 423/229, 220, 242.1, 242.2, 242.7, 210; 95/231

[56] References Cited

U.S. PATENT DOCUMENTS

| | | | |
|---|---|---|---|
| 3,255,573 | 6/1966 | Cox, Jr. | 95/231 |
| 4,430,316 | 2/1984 | Ranke et al. | 423/573 |
| 4,583,998 | 4/1986 | Reid et al. | 55/45 |
| 5,084,074 | 1/1992 | Beer et al. | 55/20 |
| 5,346,537 | 9/1994 | Lowell | 95/231 |
| 5,364,604 | 11/1994 | Spink et al. | 423/210 |
| 5,439,509 | 8/1995 | Spink et al. | 95/166 |
| 5,565,180 | 10/1996 | Spink | 423/220 |

*Primary Examiner*—Wayne Langel
*Attorney, Agent, or Firm*—F. Lindsey Scott

[57] ABSTRACT

A system and method for injecting a gaseous contaminant absorbent through at least one spray nozzle into a pipe transporting gas to a contacting vessel wherein the gas is contacted with a liquid absorbent to remove at least one gaseous contaminant from the gas is provided. The injection of the absorbent through the spray nozzles augments the efficiency of the contacting vessel by removal of a quantity of the gaseous contaminant from the gas prior to charging the gas to the contacting vessel. Water vapor is removed using a glycol absorbent and acidic gases are removed using an amine solution as an absorbent. A system and method for the removal of both water vapor and acidic gases is provided.

17 Claims, 2 Drawing Sheets

GAS TREATMENT METHOD

BACKGROUND OF THE INVENTION

1. Field of the Invention

This invention relates to a system and method for injecting a gaseous contaminant absorbent through at least one spray nozzle into a pipe transporting gas to a contacting vessel wherein the gas is contacted with additional quantities of the gaseous contaminant absorbent to remove a gaseous contaminant from the gas. The use of spray nozzles augments the efficiency of the contacting vessel by removal of a quantity of the gaseous contaminant from the gas prior to charging the gas to the contacting vessel.

2. Brief Description of the Prior Art

Natural gas as produced frequently contains contaminants such as water, acidic gases such as carbon dioxide, hydrogen sulfide, other sulfur compounds and the like. The gas is normally treated in the field to remove quantities of water, acidic gases and the like by gas treatment.

Such materials are customarily removed by use of a contacting vessel wherein the gas is contacted with a liquid absorbent to remove gaseous contaminants from the gas.

It is well known that such contacting vessels can be used to remove water vapor and acidic gases by the use of a suitable absorbent. Frequently, water vapor is removed by the use of a glycol selected from the group consisting of diethylene glycol, triethylene glycol and the like. Similarly, acidic gases can be removed by the use of amine absorbents such as aqueous solutions of monoethanolamine, diethanolamine, methyldiethanolamine, diglycol amine and combinations thereof. Such contacting vessels are well known and are widely used in the industry, but are relatively expensive and add an element of cost to the produced natural gas. Such contacting vessels and absorbents are also useful with gases, such as refinery gases and the like, where the removal of water vapor, acidic gases or both is desired.

Frequently, in an oil field operation it is found that as a result of additional discoveries, consolidation of operations, future boost gas compression and the like, an existing contacting vessel may be too small to scrub the desired quantity of gas. In such instances, it has been necessary to augment the scrubbing efficiency of the contacting vessel.

Accordingly, a considerable effort has been directed to the development of system and methods to augment the efficiency of such contacting vessels.

SUMMARY OF THE INVENTION

According to the present invention, the efficiency of a contacting vessel is augmented and at least one gaseous contaminant is removed from a gaseous stream in a pipe by passing the gaseous stream to a contacting vessel through the pipe; contacting the gaseous stream with an absorbent for the gaseous contaminant in the contacting vessel to produce a treated gaseous stream having a reduced gaseous contaminant content and a rich absorbent having an increased gaseous contaminant content; passing at least a portion of the rich absorbent to an absorbent regenerator to produce a gaseous contaminant stream and a lean absorbent having a reduced gaseous contaminant content; passing a portion of the lean absorbent to a first injection nozzle in the pipe and injecting the portion of the lean absorbent into the gaseous stream in the pipe; and passing a portion of the lean absorbent to the contacting vessel.

In an alternate embodiment of the present invention, a gaseous contaminant is removed from a gaseous stream by passing the gaseous stream through a pipe to a contacting vessel through the pipe; contacting the gaseous stream with an absorbent for the gaseous contaminant in the contacting vessel to produce a treated gaseous stream having a reduced gaseous contaminant content and a rich absorbent having an increased gaseous contaminant content; passing at least a portion of the rich absorbent to an absorbent regenerator to produce a gaseous contaminant stream and a lean absorbent having a reduced gaseous contaminant content; passing a portion of the rich absorbent to a first injection nozzle in the pipe and injecting the portion of the rich absorbent into the gaseous stream in the pipe; and passing at least a portion of the lean absorbent to the contacting vessel.

Alternatively, both rich and lean absorbent may be injected into the gaseous stream in the pipe.

The gaseous contaminant may be water vapor or an acidic gas such as carbon dioxide, hydrogen sulfide, other sulfur compounds and the like or both.

Water vapor is preferably removed as the contaminant using a glycol as the absorbent.

Acidic gases are preferably removed using an amine compound as the absorbent.

Both acidic gas and water vapor may be removed from a gaseous stream according to the present invention to produce a gaseous stream having a reduced acidic gas content and a reduced water vapor content by passing the gaseous stream through a first pipe to an acidic gas absorbent contacting vessel; contacting the gaseous stream with an acidic gas absorbent in the acidic gas absorbent contacting vessel to produce a first treated gaseous stream having a reduced acidic gas content and a rich acidic gas absorbent having an increased acidic gas content; passing at least a portion of the rich acidic gas absorbent to an acidic gas absorbent regenerator to produce an acidic gas stream and a lean acidic gas absorbent having a reduced acidic gas content; passing at least a portion of the rich acidic gas absorbent to a rich acidic gas absorbent injection nozzle in the first pipe and injecting rich acidic gas absorbent into the gaseous stream in the first pipe; passing at least a portion of the lean acidic gas absorbent to the acidic gas absorbent contacting vessel; passing the first treated gaseous stream through a second pipe to a water vapor absorbent contacting zone; contacting the treated gaseous stream with a water vapor absorbent in a water vapor absorbent contacting vessel to produce a second treated gaseous stream having a reduced acidic gas content and a reduced water vapor content and a rich water vapor absorbent having an increased water vapor content; passing at least a portion of the rich water vapor absorbent to a water vapor absorbent regenerator to produce a water vapor stream and a lean water vapor absorbent having a reduced water content; passing at least a portion of the rich water vapor absorbent to a rich water vapor absorbent injection nozzle in the second pipe and injecting the rich water vapor absorbent into the first treated gaseous stream in the second pipe; and passing at least a portion of the lean water vapor absorbent to the water vapor absorbent contacting vessel.

Either the lean acidic gas absorbent or the rich acidic gas absorbent or both may be injected into the gaseous stream in the first pipe.

Either the lean water vapor absorbent or the rich water vapor absorbent or both may be injected into the gaseous stream in the second pipe.

The present invention also includes a system for removing a gaseous contaminant from a gaseous stream comprising: a pipe in fluid communication with a gaseous stream inlet to a contacting vessel, the contacting vessel including a lean gaseous contaminant absorbent inlet and a rich gaseous contaminant absorbent outlet; a line in fluid communication with the rich gaseous contaminant absorbent outlet from the contacting vessel and a gaseous contaminant absorbent regenerator, the gaseous contaminant regenerator including a gaseous contaminant outlet and a lean gaseous contaminant absorbent outlet; a first line in fluid communication with the rich gaseous contaminant absorbent outlet from the contacting vessel and a first injection nozzle in the pipe; and a second line in fluid communication with the lean gaseous contaminant absorbent outlet from the gaseous contaminant absorbent regenerator and the lean gaseous contaminant absorbent inlet to the contacting vessel. The system may also include a third line in fluid communication with the lean gaseous contaminant absorbent outlet from the gaseous contaminant absorbent regenerator and a second injection nozzle in the pipe.

The present invention also includes a system for removing an acidic gas and water vapor from a gaseous stream comprising a first pipe in fluid communication with a gaseous stream inlet to a first contacting vessel, the first contacting vessel including a lean acidic gas absorbent inlet and a rich acidic gas absorbent outlet and a gaseous stream outlet; a first line in fluid communication with the rich acidic gas absorbent outlet from the first contacting vessel and an acidic gas absorbent regenerator, the acidic gas absorbent regenerator including an acidic gas outlet and a lean acidic gas absorbent outlet; a second line in fluid communication with the rich acidic gas absorbent outlet from the first contacting vessel and a first injection nozzle in the first pipe; a third line in fluid communication with the lean acidic gas absorbent outlet from the acidic gas contaminant absorbent regenerator and the lean acidic gas absorbent inlet to the first contacting vessel; a second pipe in fluid communication with a the gaseous stream outlet from the first contacting vessel and a gaseous stream inlet to a second contacting vessel, the second contacting vessel including a lean water vapor absorbent inlet, a rich water vapor absorbent outlet and a gaseous stream outlet; a fourth line in fluid communication with the rich water vapor absorbent outlet from the second contacting vessel and a water vapor absorbent regenerator, the water vapor absorbent regenerator including a water vapor outlet and a lean water vapor absorbent outlet; a fifth line in fluid communication with the rich water vapor absorbent outlet from the second contacting vessel and a first injection nozzle in the second pipe; and a sixth line in fluid communication with the lean water vapor absorbent outlet from the water vapor absorbent regenerator and the lean water vapor absorbent inlet to the second contacting vessel. The system may also include a seventh line in fluid communication with the lean acidic gas absorbent outlet from the acidic gas contaminant absorbent regenerator and a third nozzle in the first pipe. The system may also include an eighth line in fluid communication with the lean water vapor absorbent outlet from the water vapor absorbent regenerator and a fourth nozzle in the second pipe.

DESCRIPTION OF THE PREFERRED EMBODIMENTS

In the discussion of the Figures, the same numbers will be used throughout to refer to the same or similar components. Various pumps, valves and the like required to achieve the flows described have not been shown. Such equipment is considered well known to those skilled in the art.

Figure 1:
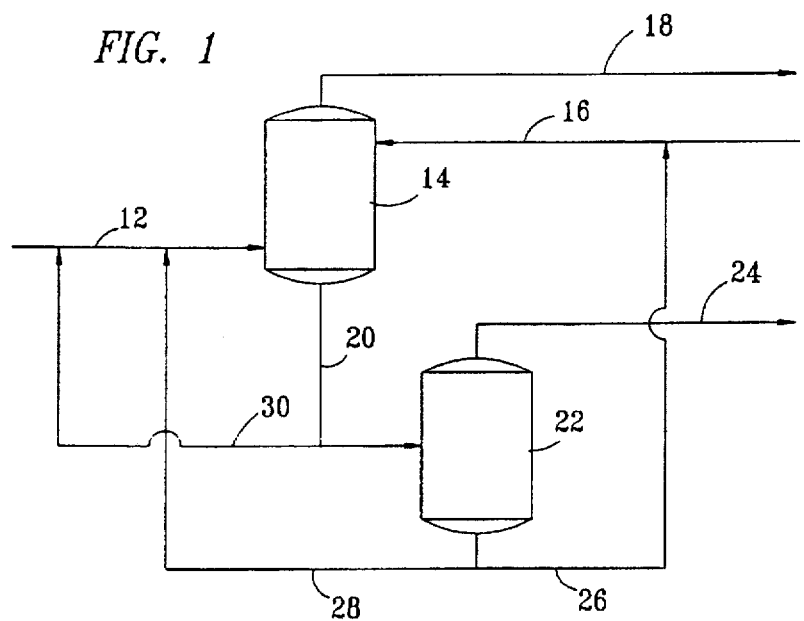
FIG. 1 is a schematic diagram of the system of the present invention for the removal of a gaseous contaminant from a gaseous stream flowing through a pipe to a contacting vessel wherein the gaseous stream is contacted with a liquid absorbent for the gaseous contaminant.

In FIG. 1, a system according to the present invention for the removal of a gaseous contaminant from a gas stream is shown. The gas passes through a pipe 12 to a contacting vessel 14 wherein the gas is counter-currently contacted with a liquid absorbent for the gaseous contaminant. The liquid absorbent is supplied via a line 16. The gaseous contaminant is at least partially removed from the gas in the contacting vessel 14 to produce a treated gas having a reduced contaminant content which is recovered through a line 18. The liquid absorbent which has been enriched in the gaseous contaminant is recovered through a line 20 as a rich liquid absorbent and passed to a rich absorbent regenerator 22 via the line 20. In the regenerator 22, the rich liquid absorbent is regenerated by thermally removing at least a portion of the gaseous contaminant from the rich liquid absorbent. The gaseous contaminant is discharged through a line 24 to further treatment or the like. At least a portion of the regenerated (lean) liquid absorbent having a reduced contaminant content is recovered through a line 26 and passed to the line 16 for return to the contacting vessel 14.

According to the present invention, a portion of the rich liquid absorbent is withdrawn from the line 20 via a line 30 and passed to an injection spray nozzle (shown in FIGS. 2–5) in the pipe 12 via the line 30. Alternatively, a portion of the lean liquid absorbent may be withdrawn from line 26 via a line 28 and passed to injection into the pipe 12 via a second spray nozzle (shown in FIGS. 2–5) in the pipe 12, or both rich and lean liquid absorbent may be sprayed into the pipe 12.

The spray nozzles in the pipe 12 which are supplied by the line 28 and the line 30, may be of a configuration schematically shown in FIG. 2–5.

Figure 2:
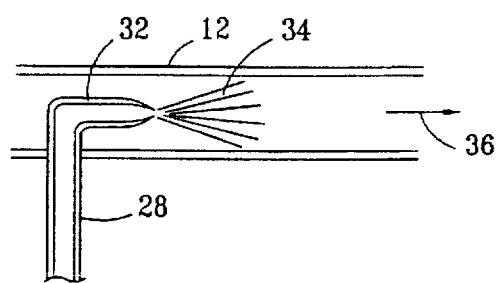
FIG. 2 is a schematic diagram of an injection nozzle positioned in a pipe for co-current injection of a spray into the gaseous stream flowing in the pipe.

In FIG. 2, a nozzle 32 is shown positioned to inject a spray 34 into the pipe 12 co-currently with a gas stream flowing through the pipe 12 as shown by an arrow 36.

Figure 3:
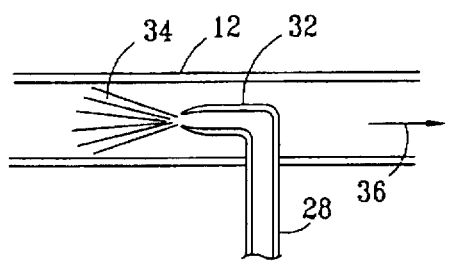
FIG. 3 is a schematic diagram of an injection nozzle positioned in a pipe for counter-current injection of a spray into the gaseous stream flowing in the pipe.

In FIG. 3, the nozzle 32 is shown in the pipe 12 positioned to direct the spray 34 counter-currently to the gas flow shown by the arrow 36.

Figure 4:
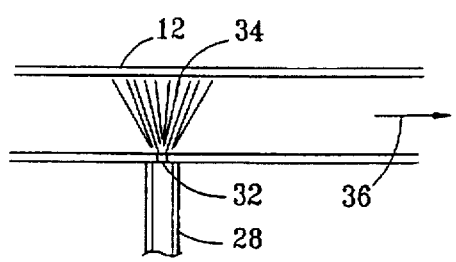
FIG. 4 is a schematic diagram of a nozzle positioned in a pipe for injection of a spray into the pipe perpendicularly to the flow of a gaseous stream flowing in the pipeline.

In FIG. 4, the nozzle 32 is shown positioned to inject the spray 34 perpendicularly to the flow of gas through the pipe 12 as shown by the arrow 36.

Figure 5:
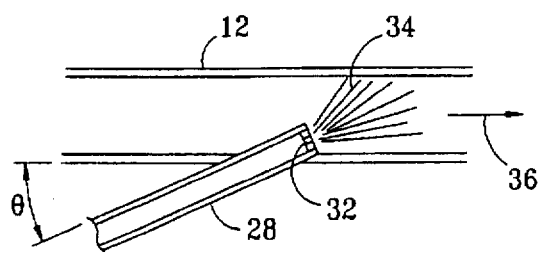
FIG. 5 is a schematic diagram of an injection nozzle positioned in a pipe for injection of a spray into the pipe at an angle θ to the flow of a gas stream flowing in the pipe.

In FIG. 5, the nozzle 32 is positioned to inject the spray 34 into the pipe 12 at an angle θ to the flow of gas in the pipe 12. The angle θ is preferably from about 5° to about 50° and the spray may be injected co-currently as shown or counter-currently.

Variations of the nozzle configuration and positioning are well known to those skilled in the art and any nozzle configuration which is effective to spray the finely divided liquid absorbent into contact with the gas as discussed hereinafter is suitable.

A single nozzle or a plurality of nozzles can be used for the injection of the rich liquid absorbent or the lean liquid absorbent supplied respectively by the lines 28 or 30 or both. The liquid absorbent is sprayed into the pipe 12, contacts the gas and adsorbs gaseous contaminant therefrom prior to passage of the gas and liquid absorbent into the contacting vessel 14. This pre-contact results in removal of a substantial quantity of the gaseous contaminant from the gas prior to charging the gas to the contacting vessel 14.

The method of the present invention is effective when the contaminant to be removed is water vapor and the liquid absorbent is a glycol selected from the group consisting of diethylene glycol, triethylene glycol, combinations thereof and the like. The use and regeneration of such glycols for water adsorption is well known to those skilled in the art, as shown in U.S. Pat. No. 5,084,074, "Method and Apparatus for Separating and Recovering Water and Light Aromatic Hydrocarbon from a Gaseous Stream," issued Jan. 28, 1992 to Beer, et al. and signed on its face to Atlantic Richfield Company. This patent is hereby incorporated in its entirety by reference.

The glycol passed to the pipe 12 through the line 16 typically has a water content of less than about 5 weight percent water. More typically, the fresh or regenerated (lean) glycol is at least 97 weight percent glycol and in some applications is over 99 weight percent glycol. The used (rich) glycol typically contains more than 2 weight percent water. Such rich glycol is capable of adsorbing additional quantities of water from the gaseous mixture in pipe 12. The system in FIG. 1 may be operated to spray only regenerated (lean) glycol into the pipe 12 or alternatively, a portion of the rich glycol may also be injected into the gas in the pipe 12 or both rich and lean glycol may be injected into the gas in the pipe 12. Desirably, pipe 12 is positioned so that liquid absorbent injected into pipe 12 is passed to contacting vessel 14.

The glycol is preferably triethylene glycol. The use of the higher glycol concentrations results in an increased driving force toward water vapor adsorption.

The use of glycol in the pipe 12 does not require that high purity glycol be used for the contact with the gas in the pipeline. Suitable adsorption of water vapor can be achieved using rich glycol which has been discharged from the contacting vessel 14. While the use of the rich glycol is effective, the use of the lean glycol is also effective. The lean glycol should be injected as shown in FIG. 1, downstream from the injection point of the rich glycol when both rich and lean glycol are used. Desirably, the pipe 12 is designed so that the glycol injected into the pipe 12 flows into the contacting vessel 14 for removal with the rich glycol from the contacting vessel 14 through the line 20.

The term "rich glycol," as used herein, refers to glycol removed from the contacting vessel 14 which has adsorbed water vapor from gas in the contacting vessel 14 to the extent desired. This glycol is capable of adsorbing additional quantities of water, although the driving force toward water adsorption has been somewhat reduced by the adsorption of water vapor in the contacting vessel 14. This spent glycol is suitable for use for injection into the pipe 12 through the line 30.

The quantity of glycol injected into the pipe 12 can vary widely and generally will be selected as that quantity necessary to augment the effectiveness of the contacting vessel 14 to the extent desired. The calculation of the amount of glycol required for such purposes is well within the skill of those in the art.

The gaseous contaminant may be acidic gas. In such instances, the liquid absorbent is desirably selected from the group consisting of amines selected from the group consisting of monoethanolamine, diethanolamine, ethyldiethanolamine, diglycolamine, combinations thereof and the like. The operation of the process is the same as discussed in connection with the glycol adsorption of water in FIG. 1. The concentration of the amines in the aqueous solution is as follows: for monoethanolamine, from about 15 to about 25 weight percent; for diethanolamine, from about 25 weight percent to about 35 weight percent; for methyldiethanolamine, from about 30 to about 50 weight percent and for diglycol amine from about 50 to about 70 weight percent. These amines may be regenerated by heating.

The use and regeneration of amines for acidic gas absorption is considered to be well known to those skilled in the art.

The method of the present invention can also be used to produce a gaseous stream from which both water vapor and acidic gases have been removed. This method is illustrated schematically in FIG. 6 wherein the contacting vessel 14 is used to contact a gaseous stream with an amine solution to remove acidic gases therefrom with the amines being regenerated in the regenerator 22 for recycle to the contacting vessel 14 and the like, as discussed above in connection with FIG. 1. The treated gas stream recovered from the contacting vessel 14 via the line 18 is passed to a second contacting vessel 14' through a pipe 12' where it is treated with glycol for water removal as discussed above. The amine treatment is conducted upstream from the glycol treatment since the amine systems comprise aqueous solutions of the desired amine. The gas will contain water vapor after the scrubbing treatment with the aqueous amine solution. The lines, vessels and the like are shown by prime numbers, i.e., 12', for the glycol contacting system in FIG. 5.

The use of the spent absorbent solutions for spray injection, as discussed above, is suitable in the method of the present invention since these materials can absorb additional quantities of water vapor or acidic gases respectively and are readily separated in the contacting vessel and passed to regeneration. By contrast in absorption vessels, there is a greater emphasis on the need for maximum absorption efficiency and a higher driving force toward absorption to permit use of vessels of a smaller size. In the present invention, the rich absorbent can also be used for absorption in the pipe 12. The absorption by the sprayed absorbents augments the efficiency of the contacting vessel.

The term "absorption" has been used herein to refer to any combination of the water vapor or acidic gas with the respective liquid absorbent material. The form or combination may be different theoretically but is generally referred to herein as "absorption" if effective to combine the contaminant with the liquid absorbent material for subsequent removal in a regeneration zone.

Co-current, counter-current, perpendicular injection, injection at a selected angle or any combination thereof can be used to spray the liquid absorbent into contact with the gaseous stream. A single nozzle or a plurality of nozzles can be used at each injection point. Desirably, the nozzles are a sufficient distance upstream from the separator to allow complete contact with the gas before the gas enters the separator. The nozzles desirably produce a spray having very small diameter particles. The nozzles used for glycol injection typically produce droplets with a volume mean diameter less than or equal to 130 microns with an area mean diameter less than or equal to 120 microns. Suitable spray nozzles are produced by Bete Fog Nozzle, Inc., Greenfield, Mass. Bete Model P-40 spray nozzles were found to be particularly suitable for glycol. For acidic gas removal, larger droplets may be required due to the larger volume of amine solution required. Bete Model P-120 spray nozzles are suitable for amine solutions. Typically, liquid/gas ratios previously used for conventional counter-current technology for both glycol and the amine solution are suitable. Other nozzles which achieve suitable dispersion of the liquid absorbent in the line 12 may also be used.

According to the present invention, when augmented scrubbing efficiency is required in the contacting vessel 14, the use of spray contacting in the pipe 12 can be used. Alternatively, the use of spray nozzles in the pipe 12 can be used to permit the use of a smaller contacting vessel 14 to achieve the same degree of contaminant removal. In either case, substantial savings are accomplished. In the first instance, additional quantities of contaminant can be removed in a contacting vessel of the same size as used previously for smaller quantities of contaminant, and in the second instance, a smaller vessel can be used to achieve the desired treatment at a reduced cost.

In the processes discussed, either the rich absorbent or the lean absorbent or both can be used for injection into the pipe 12 through the spray nozzles. The selection of either the rich absorbent stream or the lean absorbent stream or both is an economic question based upon the gas volumes, contacting vessel capacity and efficiencies in the specific process involved. The injection nozzles should be upstream from the contacting vessel 14 a sufficient distance to permit full reaction of the sprayed liquid absorbent with the gas flowing through the pipe 12.

Figure 6:
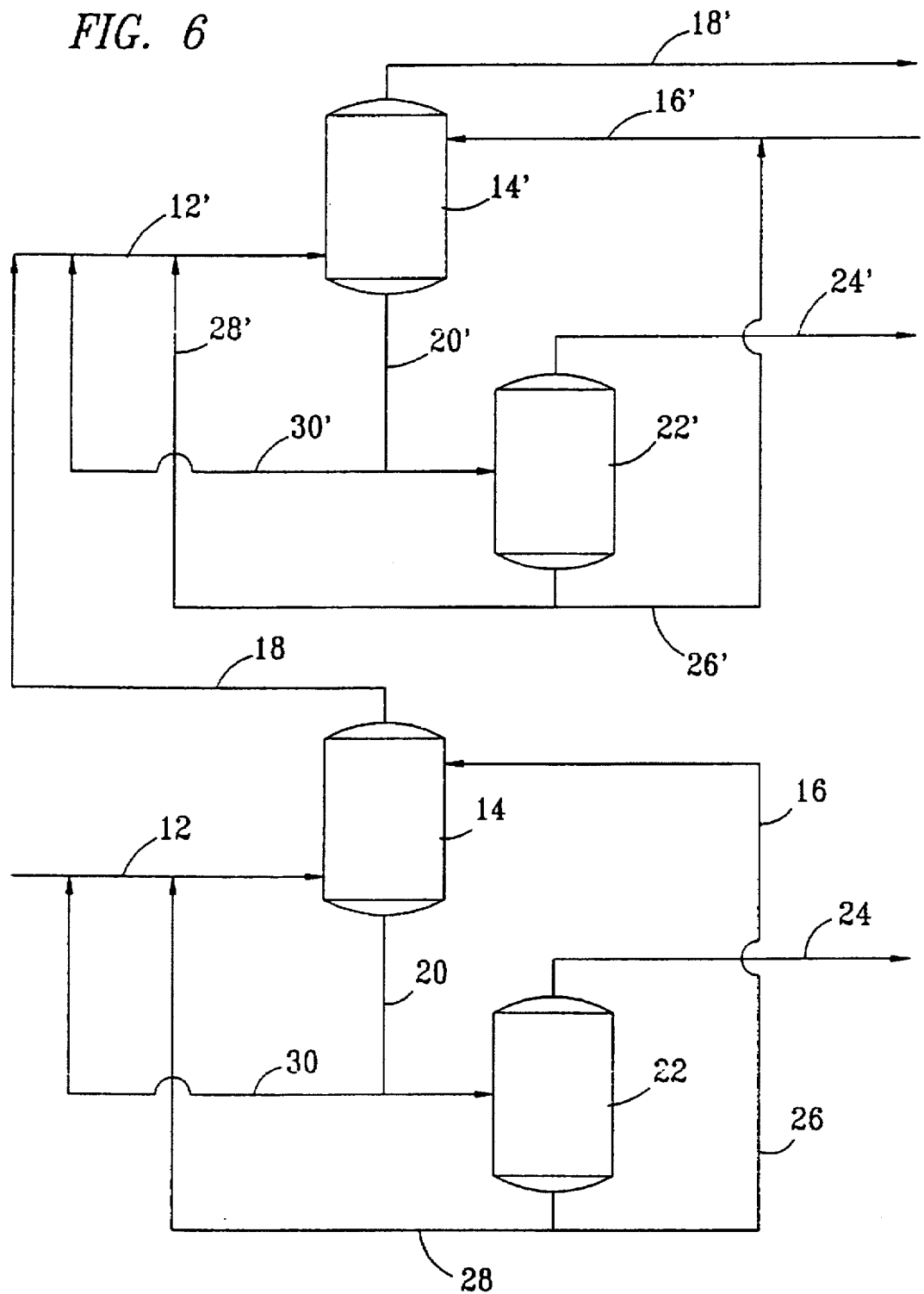
FIG. 6 is a schematic diagram of an embodiment of the system of the present invention for the removal of both water vapor and acidic gas from a gaseous stream flowing through a pipe.

In FIG. 6, a system for removing water and acid gas from a gaseous stream flowing in a pipeline is disclosed. The system comprises a first pipe 12 in fluid communication with a first contacting vessel 14 which includes a lean acidic gas absorbent inlet line 16 and a rich acidic gas absorbent outlet line 20 and a gaseous stream outlet line 18. The acidic gas outlet line 20 is in fluid communication with an acidic gas absorbent regenerator 22 which is in fluid communication with an acidic gas outlet line 24 and a lean acidic gas absorbent outlet line 26. The system also includes a line 30 in fluid communication with the line 20 and a first injection nozzle in the line 12. The system also includes a line 26 in fluid communication with the line 16. Additionally or alternatively, a line 28 is provided in fluid communication with the line 26 and a second fluid injection nozzle in the pipe 12. The gas in the line 18 is passed to a pipe 12' and then to a second contacting vessel 14 which is in fluid communication with a gaseous outlet line 18', a lean water vapor absorbent inlet line 16' and a rich water vapor absorbent outlet line 20'. The line 20' is in fluid communication with a rich water vapor absorbent regenerator 22'. The water vapor absorbent regenerator 22' is in fluid communication with a water vapor outlet line 24' and a lean water vapor absorbent outlet line 26'. A line 30' is provided in fluid communication with the line 20' and a first injection nozzle in the second pipe 12'. The line 26' is also in fluid communication with the line 16'. The system may additionally or alternatively include a line 28' in fluid communication with the line 26' and a second nozzle in the pipe 12'.

EXAMPLE

A test is conducted wherein 15 million standard cubic feet per day (MMscfd) of a natural gas is injected through the pipe 12 at 800 pounds per square inch gauge (psig) at 100° F. with a water content of 72.2 pounds of water per MMscfd of gas into a contacting vessel wherein 98.7 percent pure triethylene glycol is injected for intimate counter-current contact with the gas at a rate of 2.8 gallons per minute which corresponds to 4.0 gallons of triethylene glycol per pound of water to be removed. The outlet gas is recovered with a water concentration of 5 pounds of water per MMscfd of gas. The outlet glycol is 96.1 percent triethylene glycol. The contacting vessel has a contacting capacity equal to 1.77 theoretical trays.

In a comparative test, a portion of the outlet glycol is recycled to the pipe 12 through two different spray nozzle systems. In the first system, a P-40 nozzle is used to spray 1.35 gallons per minute (3 gallons of triethylene glycol per pound of water to be removed) into the pipe 12. With the second system, a Bete Model P-54 nozzle is used to spray 4.5 gallons per minute of triethylene glycol (10 gallons of triethylene glycol per pound of water to be removed) into pipe 12. In both instances, the outlet glycol stream from the contacting tower is 96.1 percent triethylene glycol. The inlet glycol stream is identical to that used in the first test and the outlet gas is recovered with a water concentration of 5 pounds of water per MMscfd of gas. The tower efficiency required in the second embodiment, is only 1.13 theoretical trays. This is a substantial reduction in the amount of tower efficiency required to accomplish the same contaminant removal without the recycle glycol injection.

The preceding example shows that a smaller contacting vessel can be used to achieve comparable contaminant removal by the method of the present invention. Alternatively, the efficiency of a given contacting vessel can be augmented by the method of the present invention.

Having thus described the present invention by reference to its preferred embodiments, it is pointed out that the embodiments described are illustrative rather than limiting in nature and that many variations and modifications are possible within the scope of the present invention. Many such variations and modifications may be considered obvious and desirable to those skilled in the art based upon a review of the foregoing description of the preferred embodiments.

Having thus described the invention, we claim:

1. A method for augmenting the efficiency of a glycol contacting vessel for removing water vapor from a gaseous stream, the method comprising:

a. passing the gaseous stream to the glycol contacting vessel through a pipe;

b. contacting the gaseous stream with glycol in the glycol contacting vessel to produce a treated gaseous stream having a reduced water content and a rich glycol having an increased water content;

c. passing at least a portion of the rich glycol to a rich glycol regenerator to produce a water stream and a lean glycol having a reduced water content;

d. passing a portion of the lean glycol to a first injection nozzle in the pipe and injecting the portion of the lean glycol into the gaseous stream in the pipe; and e. passing a portion of the lean glycol to the glycol contacting vessel.

2. The method of claim 1 wherein a portion of the rich glycol is passed to a second injection nozzle in the pipe, the second injection nozzle being upstream from the first injection nozzle in the pipe and injected into the gaseous stream in the pipe.

3. The method of claim 2 wherein the glycol is selected from the group consisting of diethylene glycol, triethylene glycol and combinations thereof.

4. The method of claim 1 wherein the glycol is selected from the group consisting of diethylene glycol, triethylene glycol and combinations thereof.

5. A method for augmenting the efficiency of a glycol contacting vessel for removing water vapor from a gaseous stream, the method comprising:
   a. passing the gaseous stream to a glycol contacting vessel through a pipe;
   b. contacting the gaseous stream with glycol in the glycol contacting vessel to produce a treated gaseous stream having a reduced water content and a rich glycol having an increased water content;
   c. passing at least a portion of the rich glycol to a rich glycol regenerator to produce a water stream and a lean glycol having a reduced water content;
   d. passing a portion of the rich glycol to a first injection nozzle in the pipe and injecting the portion of the rich glycol into the gaseous stream in the pipe; and
   e. passing a portion of the lean glycol to the glycol contacting vessel.

6. The method of claim 5 wherein the glycol is selected from the group consisting of diethylene glycol, triethylene glycol and combinations thereof.

7. A method for augmenting the efficiency of a contacting system for removing an acidic gas and water vapor from a gaseous stream to produce a gaseous stream having a reduced acidic gas content and a reduced water vapor content, the method comprising:
   a. passing the gaseous stream through a first pipe to an amine contacting vessel;
   b. contacting the gaseous stream with an amine in the amine contacting vessel to produce a first treated gaseous stream having a reduced acidic gas content and a rich amine having an increased acidic gas content;
   c. passing at least a portion of the rich amine to an amine regenerator to produce an acidic gas stream and a lean amine having a reduced acidic gas content;
   d. passing a stream of the amine to a first amine injection nozzle in the first pipe and injecting the stream of amine into the gaseous stream in the first pipe;
   e. passing at least a portion of the lean amine to the amine contacting vessel;
   f. passing the first treated gaseous stream through a second pipe to a glycol contacting vessel;
   g. contacting the first treated gaseous stream with glycol in the glycol contacting vessel to produce a second treated gaseous stream having a reduced acidic gas content and a reduced water vapor content and a rich glycol having an increased water content;
   h. passing at least a portion of the rich glycol to a glycol regenerator to produce a water vapor stream and a lean glycol having a reduced water content;
   i. passing a stream of glycol to a first glycol injection nozzle in the second pipe and injecting the stream of glycol into the first treated gaseous stream in the second pipe; and
   j. passing at least a portion of the lean glycol to the glycol contacting vessel.

8. The method of claim 7 wherein the stream of amine injected through the first amine rejection nozzle is rich amine.

9. The method of claim 7 wherein the stream of amine injected through the first amine injection nozzle is lean amine.

10. The method of claim 8 wherein a stream of lean amine is injected into the first pipe through a second amine injection nozzle in the first pipe.

11. The method of claim 7 wherein the stream of glycol injected through the first glycol injection nozzle in the second pipe is rich glycol.

12. The method of claim 7 wherein the stream of glycol injected through the first glycol injection nozzle in the second pipe is lean glycol.

13. The method of claim 11 wherein a stream of lean glycol is injected into the second pipe through a second glycol injection nozzle in the second pipe.

14. The method of claim 8 wherein the stream of glycol injected through the first injection nozzle in the second pipe is rich glycol.

15. The method of claim 8 wherein the stream of glycol injected through the first glycol injection nozzle in the second pipe is lean glycol.

16. The method of claim 7 wherein the glycol is selected from the group consisting of diethylene glycol, triethylene glycol and combinations thereof.

17. The method of claim 7 wherein the acidic gas is selected from the group consisting of carbon dioxide, hydrogen sulfide, other sulfur compounds and combinations thereof and wherein the amine is selected from the group consisting of monoethanolamine, diethanolamine, methyldiethanolamine, diglycolamine and combinations thereof.

* * * * *